(12) United States Patent
Bernau et al.

(10) Patent No.: US 10,746,567 B1
(45) Date of Patent: Aug. 18, 2020

(54) PRIVACY PRESERVING SMART METERING

(71) Applicant: SAP SE, Walldorf (DE)

(72) Inventors: Daniel Bernau, Karlsruhe (DE);
Philip-William Grassal, Heidelberg (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 19 days.

(21) Appl. No.: 16/361,405

(22) Filed: Mar. 22, 2019

(51) Int. Cl.
*G01D 4/00* (2006.01)
*G06Q 50/06* (2012.01)
*H04L 29/06* (2006.01)

(52) U.S. Cl.
CPC ............. *G01D 4/002* (2013.01); *G06Q 50/06* (2013.01); *H04L 63/0414* (2013.01)

(58) Field of Classification Search
CPC ..... G01D 4/002; G06Q 50/06; H04L 63/0414
See application file for complete search history.

(56) References Cited

U.S. PATENT DOCUMENTS

| | | | |
|---|---|---|---|
| 7,818,200 B2 | 10/2010 | Kerschbaum et al. |
| 7,836,483 B2 | 11/2010 | Kerschbaum et al. |
| 7,860,244 B2 | 12/2010 | Kerschbaum |
| 7,860,245 B2 | 12/2010 | Kerschbaum et al. |
| 7,869,598 B2 | 1/2011 | Kerschbaum |
| 7,986,780 B2 | 7/2011 | Kerschbaum et al. |
| 7,995,750 B2 | 8/2011 | Kerschbaum et al. |
| 8,010,782 B2 | 8/2011 | Kerschbaum |
| 8,015,080 B2 | 9/2011 | Kerschbaum et al. |
| 8,060,758 B2 | 11/2011 | Kerschbaum et al. |
| 8,130,947 B2 | 3/2012 | Kerschbaum et al. |
| 8,131,999 B2 | 3/2012 | Kerschbaum |
| 8,291,509 B2 | 10/2012 | Kerschbaum et al. |
| 8,321,666 B2 | 11/2012 | Kerschbaum |
| 8,365,298 B2 | 1/2013 | Kerschbaum et al. |

(Continued)

OTHER PUBLICATIONS

Ács and Castelluccia, "I have a DREAM! (DiffeRentially PrivatE smArt Metering)," International Workshop on Information Hiding, May 2011, 16 pages.

(Continued)

*Primary Examiner* — James J Yang
(74) *Attorney, Agent, or Firm* — Fish & Richardson P.C.

(57) ABSTRACT

Methods, systems, and computer-readable storage media for privacy preserving metering is described herein. A resource threshold value associated with anonymizing meter data for resources metered at a first destination is received. Based on a noise scale value and the resource threshold value, an individual inference value of the first destination is computed. The individual inference value defines a probability of distinguishing the first destination as a contributor to a query result based on anonymized meter data of the first destination and other destinations according to the noise scale value. The noise scale value is defined for a processing application. Based on evaluating the individual inference value, it is determined to provide anonymized meter data for metered resources at the first destination. An activation of a communication channel for providing the anonymized meter data for metered resources is triggered. The communication channel is between the first destination and the processing application.

20 Claims, 6 Drawing Sheets

(56) References Cited

U.S. PATENT DOCUMENTS

| | | |
|---|---|---|
| 8,473,741 B2 | 6/2013 | Kerschbaum |
| 8,526,603 B2 | 9/2013 | Kerschbaum |
| 8,533,487 B2 | 9/2013 | Kerschbaum et al. |
| 8,538,799 B2 | 9/2013 | Haller et al. |
| 8,548,172 B2 | 10/2013 | Kerschbaum |
| 8,572,405 B2 | 10/2013 | Kerschbaum |
| 8,584,232 B2 | 11/2013 | Kerschbaum |
| 8,688,973 B2 | 4/2014 | Kerschbaum et al. |
| 8,731,199 B2 | 5/2014 | Jawurek et al. |
| 8,811,620 B2 | 8/2014 | Chaves et al. |
| 8,839,410 B2 | 9/2014 | Kerschbaum |
| 8,880,867 B2 | 11/2014 | Jawuerk et al. |
| 9,003,204 B2 | 4/2015 | Haerterich et al. |
| 9,025,834 B2 | 5/2015 | Hang et al. |
| 9,037,860 B1 | 5/2015 | Kerschbaum et al. |
| 9,064,229 B2 | 6/2015 | Chaves et al. |
| 9,111,071 B2 | 8/2015 | Kerschbaum |
| 9,159,046 B2 | 10/2015 | Kerschbaum |
| 9,213,764 B2 | 12/2015 | Kerschbaum et al. |
| 9,342,707 B1 | 5/2016 | Kerschbaum et al. |
| 9,425,960 B2 | 8/2016 | Kerschbaum et al. |
| 9,537,838 B2 | 1/2017 | Hang et al. |
| 9,547,720 B2 | 1/2017 | Hang et al. |
| 9,607,161 B2 | 3/2017 | Haerterich et al. |
| 9,740,879 B2 | 8/2017 | Hahn et al. |
| 9,800,558 B2 | 10/2017 | Kerschbaum |
| 9,830,470 B2 | 11/2017 | Kerschbaum et al. |
| 10,162,858 B2 | 12/2018 | Kerschbaum et al. |
| 2009/0055382 A1 | 2/2009 | Kerschbaum |
| 2011/0271352 A1* | 11/2011 | Kalogridis ............... G01D 4/02 726/26 |
| 2012/0121080 A1 | 5/2012 | Kerschbaum |
| 2014/0214685 A1* | 7/2014 | Le Buhan .......... G06Q 30/0283 705/63 |
| 2014/0372769 A1 | 12/2014 | Kerschbaum et al. |
| 2016/0275633 A1* | 9/2016 | Gitt .................... G06Q 30/0283 |
| 2017/0139985 A1 | 5/2017 | Hahn et al. |
| 2018/0004978 A1 | 1/2018 | Hebert et al. |
| 2018/0019866 A1 | 1/2018 | Kerschbaum |
| 2018/0113905 A1 | 4/2018 | Goerzig et al. |
| 2018/0307854 A1 | 10/2018 | Bernau et al. |
| 2018/0322279 A1 | 11/2018 | Beskorovajnov et al. |

OTHER PUBLICATIONS

Bao and Lu, "A New Differentially Private Data Aggregation with Fault Tolerance for Smart Grid Communications," IEEE Internet of Things Journal, vol. 2, Issue 3, Jun. 2015, 11 pages.

Barbosa et al., "A Technique to Provide Differential Privacy for Appliance Usage in Smart Metering," Informational Sciences, vol. 370, Aug. 2016, 13 pages.

Buescher et al., "Two is Not Enough: Privacy Assessment of Aggregation Schemes in Smart Metering," Proceedings on Privacy Enhancing Technologies, vol. 2017, Issue 4, Oct. 2017, 17 pages.

Dwork et al., "Calibrating Noise to Sensitivity in Private Data Analysis," Theory of Cryptography Conference, Mar. 2006, 20 pages.

Dwork et al., "Differential Privacy Under Continual Observation," Proceedings of the Forty-Second ACM Symposium on Theory of Computing, ACM, Jun. 2010, 10 pages.

Dwork and Roth, The Algorithmic Foundations of Differential Privacy, Foundations and Trends in Theoretical Computer Science, vol. 9, Nos. 3-4, Aug. 2014, 281 pages.

Dwork, "Differential Privacy," 33rd International Colloquium on Automata, Languages, and Programming part II, Jul. 2006, 12 pages.

Eibl and Engel, "Differential Privacy for Real Smart Metering Data," Computer Science—Research and Development, vol. 32, Issue 1-2, Jul. 2016, 12 pages.

Hong et al., "Global Energy Forecasting Competition 2012," International Journal of Forecasting, vol. 30, Apr.-Jun. 2014, 7 pages.

Hsu et al., "Differential Privacy: An Economic Method for Choosing Epsilon," 27th IEEE Computer Security Foundations Symposium, Feb. 2014, 29 pages.

Kairouz, "The Composition Theorem for Differential Privacy," IEEE Transactions on Information Theory, vol. 63, No. 6, Jun. 2017, 13 pages.

Lee and Clifton, "Differential Identifiability," 18th ACM SIGKDD International Conference on Knowledge, Discovery, and Data Mining, Aug. 2012, 9 pages.

Li et al., "Membership Privacy: A Unifying Framework for Privacy Definitons," 2013 ACM SIGSAC Conference on Computer and Communications Security, Nov. 2013, 13 pages.

* cited by examiner

PRIVACY PRESERVING SMART METERING

BACKGROUND

Companies ensure security of their systems and data. Some data stored at enterprise systems include personally identifiable and privacy sensitive information. Therefore, such data have to be protected. Enterprise systems provide access to data stored in underlying databases and storages. For example, an application may interact with a database system or data storage to perform operations over stored data. At the same time, companies have to respect the data protection rules and regulations regarding the privacy of stored and manipulated data. For example, companies may store and/or manipulate privacy sensitive data for different business purposes. Data anonymization, such as meter data, may be used with respect to protecting privacy sensitive data. The process of data anonymization includes removing and/or altering data in an effort to make it impossible to determine the privacy information included in the data and inferring the identity of the data source.

SUMMARY

Implementations of the present disclosure are directed to computer-implemented methods for evaluation of identity inference risk during data anonymization. More particularly, implementations of the present disclosure are directed to anonymization of meter data based on individual probability valuation for distinguishing an identity of a source associated with the meter data during data analysis.

In some implementations, actions include receiving a resource threshold value associated with anonymizing meter data for resources metered at a first destination; based on a noise scale value and the resource threshold value, computing an individual inference value of the first destination, the individual inference value defining a probability of distinguishing the first destination as a contributor to a query result based on anonymized meter data of the first destination and other destinations according to the noise scale value, wherein the noise scale value is defined for a processing application; based on evaluating the individual inference value, determining to provide anonymized meter data for metered resources at the first destination; and triggering an activation of a communication channel for providing the anonymized meter data for metered resources at the first destination to the processing application.

Other implementations of this aspect include corresponding systems, apparatus, and computer programs, configured to perform the actions of the methods, encoded on computer storage devices. These and other implementations can each optionally include one or more of the following features: meter data for resources consumed at the first destination is anonymized based on the noise scale value; the communication channel is activated for providing the anonymized meter data for consumed resources at the first destination to the processing application directly.

Further, these and other implementations can also optionally include that the query result is associated with an acceptable accuracy level for a data consumer associated with the processing application, and wherein the acceptable accuracy level relates to a deviation of an algorithm applied on the meter data anonymized according to the noise scale value to compute the query result.

Further, these and other implementations can also optionally include that the resource threshold value is defined based on evaluation of historic data associated with consumed resource at the first destination and a maximum value on a metering scale for the consumed resources at the first destination.

Further, these and other implementations can also optionally include receiving the resource threshold value as a user input at a web portal, wherein the resource threshold value is a lower value than a maximum value on the metering scale for the consumed resources at the first destination; and presenting the computed individual inference value on the web portal.

Further, these and other implementations can also optionally include the determining to provide the anonymized meter data further includes determining whether the individual inference value is acceptable based on a comparison with a threshold value defining an acceptable confidentiality inference probability of the first destination.

Further, these and other implementations can also optionally include that determining whether the individual inference value is acceptable further comprises: receiving an input identifying the threshold value for the individual risk value; and when the computed individual inference value is below the threshold value, determining that the individual inference value is acceptable.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to computation and evaluation of an individual risk value of a source destination associated with meter data for consumed resources. More particularly, implementations of the present disclosure are directed to computing the individual risk value based on a noise scale value for data anonymization defined for a data consumer of the meter data and a resource threshold value associated with privacy guarantee interpretation when the meter data is anonymized based on the noise scale value.

Implementations can include actions of receiving a resource threshold value associated with anonymizing meter data for resources metered at a first destination; based on a noise scale value and the resource threshold value, computing an individual inference value of the first destination, the individual inference value defining a probability of distinguishing the first destination as a contributor to a query result based on anonymized meter data of the first destination and other destinations according to the noise scale value, wherein the noise scale value is defined for a processing application; based on evaluating the individual inference value, determining to provide anonymized meter data for metered resources at the first destination; and triggering an activation of a communication channel for providing the anonymized meter data for metered resources at the first destination to the processing application.

Figure 1:
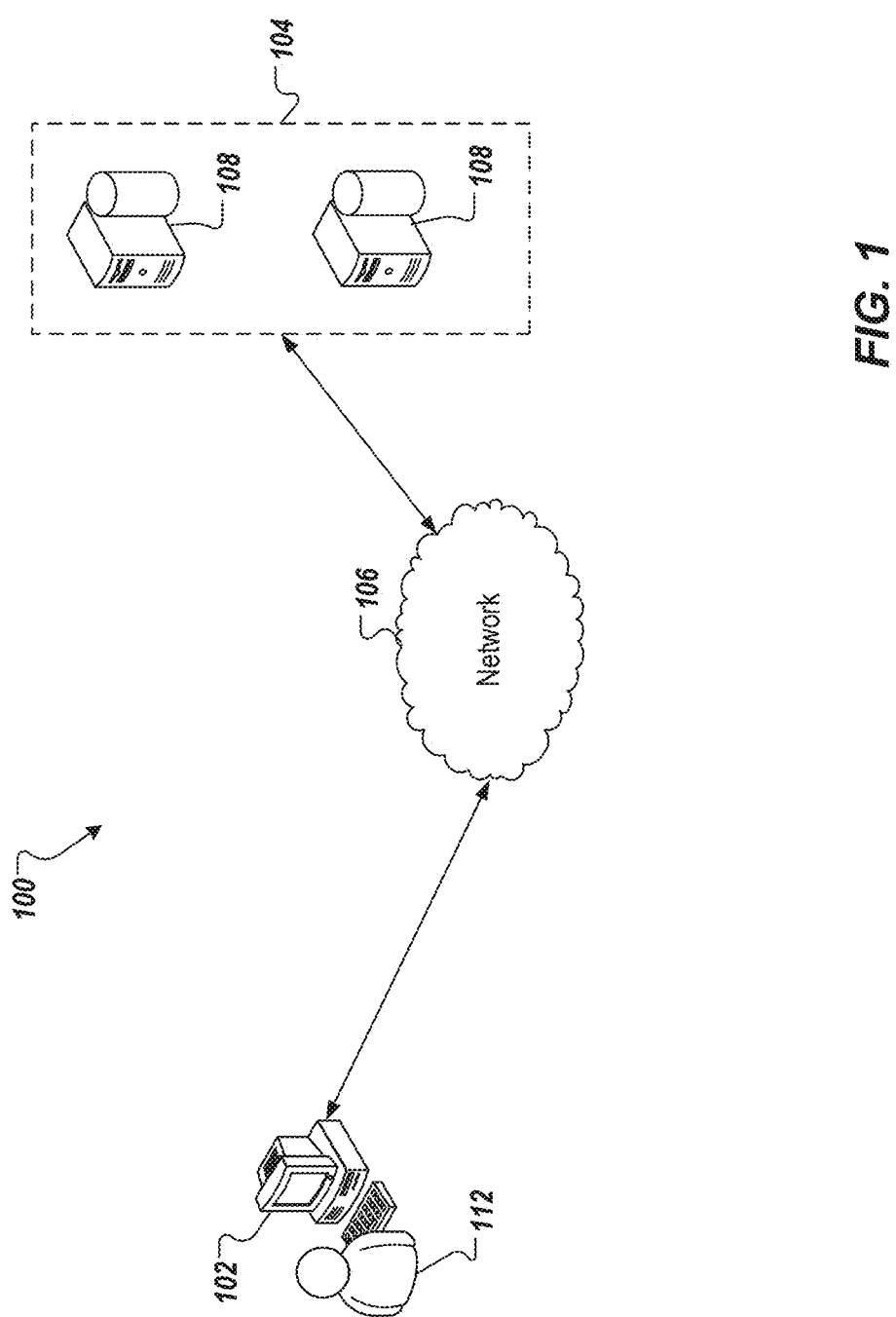
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an application (e.g., provided as one or more computer-executable programs executed by one or more computing devices). For example, input data may be provided to the server system 104, e.g. from a data provider, data consumer, other external data source, or combination thereof. The server system 104 may process received input data through based on implemented application logic and perform data computations and evaluations in relation to anonymization of meter privacy sensitive data for consumer resources at a destination source.

As introduced above, implementations of the present disclosure are directed to maintaining data privacy through data anonymization and supporting a process of exchange of privacy sensitive meter data between parties, such as data providers (or data sources) and data consumers. Data, such as meter data for consumer resources, may be used for data analysis and prediction. As used herein, meter data refers to data that represents a quantity of a consumable (e.g., gas, electricity, water). In some examples, a meter records the quantity of the consumable that is consumed (e.g., at a location, by a user), and generates the meter data. In some examples, analysis of meter data can result in information leakage, which could reveal sensitive information (e.g., identity of a data provider, such as a source destination where data is collected). As meter data is privacy sensitive and should be privacy protected, anonymization may be applied over the data before the data is provided to adversary parties. Once data is anonymized it may be used for analysis including data manipulation techniques executed at a data consumer's side.

Data consumers have the incentive to use meter data, as it may provide valuable insight. Analysis over meter data may provide insight on behavior patterns for resource consumption at given destinations or consumption sources points. For example, energy providers are training load forecast models based on aggregated private data provided by electricity consumers (e.g., households). In such a scenario, the energy providers are in the role of data consumers or data analysist and the households are data providers of meter energy consumption data. Energy providers are data consumers that have, for example, the incentive to forecast the aggregate load of consumption to be able to provide resources in a scheduled manner, at lower costs, with reduced resource losses, etc. However, if data is provided in a non-anonymized manner, data providers identity may be inferred by the data consumers, as aggregation of data from multiple providers does not guarantee privacy protection. Data providers identity may include inference of a destination where data is collected. For meter data for consumed resources at a source destination, a data provider may be such as a household or a person representing the household where resources are consumed and metered. If meter data is not anonymized, then the identity of the data provider and the destination of metering the data may be inferred, which may be undesirable for a data provider.

Collected meter data is used for data analysis and accuracy of analysis is dependent on the used meter data. By anonymizing the data prior analysis, the analysis result accuracy may be reduced and anonymization may bring analysis errors or deviations. Therefore, from the data consumers perspective, anonymization of data may be desired to be performed up to a bound of an acceptable analysis error. For example, adding noise to a query result based on an anonymization technique may result in deviation in a forecasting algorithm and the computed forecast results.

To address such a scenario, information flow of meter data between data providers (e.g., households providing meter data, destination sources for metering consumption data, etc.) and data consumers (e.g. energy providers as data analysists of meter data) may be performed based on privacy preserving guarantees that are acceptable for the parties. A data consumer, such as a data analyst, evaluating meter data, may define a desired utility bound by determining a noise scale value $\lambda$ for perturbation of the original meter data when anonymized. The utility bound may be quantified based on an acceptable utility loss level for an analysis method, such as a forecasting method.

The present disclosure provides implementations that are related to evaluation of a privacy inference risk when an anonymization technique associated with the noise scale value $\lambda$ is applied over meter data. A data provider of meter data may calculate their individual risk value based on the noise scale value $\lambda$ and on a boundary value associated with the meter data. The boundary value may be defined by the data provider in relation to the resource consumption that is being metered. The boundary value may be determined based on previous data for the consumed resources associated with the meter data, e.g. average amount of consumed resources for a time period, highest level of consumption, maximum possible consumption on a consumption scale range, etc.

In accordance with implementations of the present disclosure, an individual risk value for the data provider may be computed and used to evaluate whether the proposed noise scale value $\lambda$ from the data consumer is acceptable for the data provider. Further, it may be determined whether privacy protection of anonymized data would be maintained to a threshold privacy level defined as acceptable for the data provider.

Based on the noise scale value and the boundary value, a data provider may be provided with a corresponding level of privacy protection from an adversary to confidently distinguish whether the data provider has provided meter data and has contributed to an aggregated query based on meter data. The calculated individual risk value may be defined in the range of values between 0.5 to 1. A risk value equal to 0.5 corresponds to random guessing whether the provider has contributed to the aggregated query or not. Such individual risk value of 0.5 may be interpreted as perfect privacy protection. A data provider that wants his data to be privacy protected may evaluate a risk value closer to 0.5 to provide him with a high certainty of confidentiality.

In some example, a threshold privacy level may be defined and used to evaluate the computed risk value. The threshold privacy level may be defined as a probability value that defined an acceptable confidentiality inference probability for a destination associated with provided meter data. A threshold privacy level may be defined at level 0.6, where if a risk value is computed to be above that value, then the data provider may determine to reject the proposed noise scale value $\lambda$ for data anonymization. A risk value of 0.6 may be interpreted as a scenario where an adversary is not able to identify that a data provider has contributed with data for performing of a data query with more than 60% confidence.

In accordance with implementations of the present disclosure, data anonymization techniques may be applied over meter data as provided by data providers. Such anonymized data may be used for data analysis relevant for the data consumers. Data anonymization techniques may be applied over meter data before providing for analysis. For example, differential privacy can be used as a data anonymization technique. By implementing differential privacy, privacy protection of meter data is achieved by perturbing (i.e., adding random noise) a result of a query performed over the data. Anonymized data is no longer possible to be used to confidently determine whether the query result was obtained by querying a data set D1 (e.g., the initial meter data set) or some other data set D2, differing in one individual data set element. When anonymized data is received from multiple data providers, the presence or absence of data from a provider may be considered negligible for computing the perturbed query result. Differential privacy mechanisms may be utilized to add noise into the query result. For example, to add noise into the result of some arbitrary query $f(\bullet)$, a mechanism M is utilized. Mechanism M adds noise that is sampled from a probability distribution to $f(\bullet)$. An output R of a query is $(\epsilon, \delta)$-differentially private if for all data sets D1 and D2 of a domain space of the mechanism M (D1 and D2 differ in only one individual and for all possible outputs $S \in R$), when the equation (1) is valid:

$$\Pr[M(D1) \in S] \leq e^{\wedge}\epsilon * \Pr[M(D2) \in S] + \delta, \quad (1)$$

where additive $\delta$ is interpreted as the probability of protection failure and required to be negligibly small, for example, $\ll 1/D1$.

The differential privacy technique provides that an adversary may not determine whether an output from a query, such as S, was computed using D1 or D2. A data set may be considered as differentially private if it has been obtained by a differentially private mechanism, such as M discussed above.

In some examples, a query applied over data may be specified as a series of k identical aggregate queries $f_i$. Adding noise to the query result provides to hide the influence of any individual element (e.g., data source) in the original result of the composed query $f=(f_1, \ldots, f_k)$. The maximum influence of an individual contribution on $f(\bullet)$ is the global sensitivity $\Delta f = \max_{D_1, D_2} \|f(D_1) - f(D_2)\|_1$.

In some examples, a mechanism for perturbing an outcome of numerical query functions is the Laplace mechanism. It adds noise calibrated with the global sensitivity by drawing a random sample from the Laplace distribution with mean $\mu=0$ and noise scale value $$\lambda = \frac{\Delta f}{\epsilon}.$$

Given a series of k identical numerical query functions $f=(f_1, \ldots, f_k)$, the Laplace Mechanism is defined by equation (2):

$$K_{Lap}(D, f, \epsilon) := f(D) + (z_1, \ldots, z_k) \quad (2)$$

The Laplace Mechanism is an $(\epsilon, 0)$-differentially private mechanism when all $z_i$ with $1 \leq i \leq k$ are independently drawn from the random variable $$Z \sim Lap\left(z, \text{scale} = \frac{\Delta f}{\epsilon}, \text{mean} = 0\right).$$

When a function is evaluated multiple times, an overall privacy loss occurs. Under worst case assumptions, a series of k evaluations of any $(\epsilon, \delta)$-differentially private mechanism M on the same set of individuals results in $(k\epsilon, k\delta)$-Differential Privacy.

In accordance with implementations of the present disclosure, a model for interpreting privacy guarantee $\epsilon$ is provided, where a differential identifiability of an output from a query based on a true original data set D1 as provided can be identified by an adversary with confidence less that a risk value $\rho$. The risk value $\rho$ is in a relation with the privacy guarantee E according to equation (3) below.

$$\epsilon = \ln\left(\frac{\rho}{1-\rho}\right) \text{ and } \rho = \frac{1}{1+e^{-\epsilon}} > \frac{1}{2} \qquad (3)$$

Accordingly, the risk value $\rho$ as defined in relation to the privacy guarantee value E provides an interpretation of the privacy inference risk when applying ($\epsilon$, 0)-Differential Privacy. When $\delta>0$, we define that the confidence of $\rho$ holds with probability 1-$\delta$.

In accordance with implementations of the present disclosure, by defining an upper bound for utility of data when perturbed, a noise scale value $\lambda$ may be defined according to the Laplace mechanism. The defined noise scale value $\lambda$ corresponds to providing a $$\left(\frac{\Delta f}{\lambda} = \epsilon, \delta\right) - \text{Differential Privacy}$$

for a data provider that agrees to a noise scale value $\lambda$. For example, a household that is a data provider for meter data interprets their privacy level by deriving inference risk through differential identifiability and a risk value $\rho$ as discussed above. Perturbing meter data may be performed at the data sources, where consumed resources are metered, by decomposing Laplace noise into gamma noise for distributed noise generation at a data provider level. A privacy decay function defining risk of privacy inferences is a function of $\epsilon$, $\delta$, and time k, where privacy guranteee representation is difficult to interpret in the context of risk of identifyiablity which can be evaluated by a data provider.

In some implementations, the privacy gurantee is translated into an interpretable risk $\rho$ as defined by equation (3) above. The risk value $\rho$ represents the upper bound for the confidence of an adversary trying to infer the identity of a single data provider, such as a household providing meter data to an energy provider.

Figure 2:
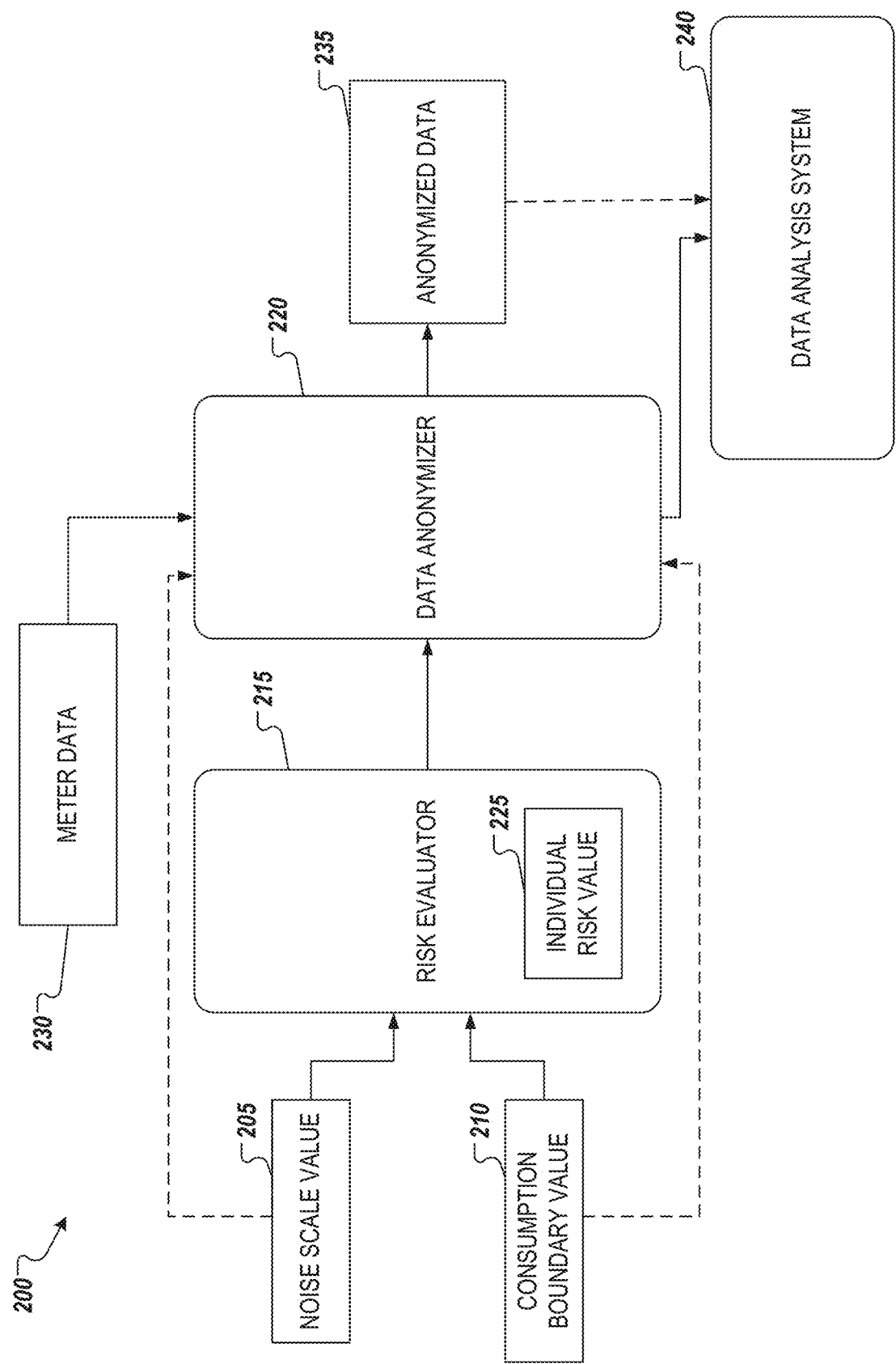
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture includes a risk evaluator 215, a data anonymizer 220, and a data analysis system 240. In this example, the risk evaluator 215 is implemented to include computation and evaluation logic in relation to providing meter data 230 from a data provider to a data consumer. The meter data 230 is data for consumed resources at a given destination. The meter data 230 may be provided by an associated data provider and may be privacy sensitive data as discussed above, which may be used by a data consumer for analysis.

The example conceptual architecture 200 of FIG. 2 is implemented to address the scenario discussed above where meter data may be exchanged between data providers (e.g., households providing meter data, other) and data consumers (e.g. energy providers, data analysts of meter data, other) based on privacy preserving guarantees that are acceptable for the parties.

The risk evaluator 215 receives a noise scale value 205 and a consumption boundary value 210 as input parameters to determine an individual risk value 225 for the data provider. The consumption boundary value 210 may be a resource threshold value defining a threshold value for consumption of resources, such as energy, at a given destination, such as a household. The individual risk value 225 may be a individual inference value associated with identity inference of meter data provided in an anonymized form according to the noise scale value 205.

For example, the data provider may be a household that provides meter data for energy consumption. The meter data defines consumed energy resources at the household. The meter energy consumption data may be provided to an energy provider in an anonymized form for performing data analysis according to an acceptable privacy guarantee, such as privacy guarantee value E discussed above.

In accordance with the implementation of the present disclosure, the noise scale value 205 is defined in relation to a data consumer (e.g., energy provider) that may utilize received meter data 230 in an anonymized form for data analysis. The noise scale value 205 may be defined as a Laplace noise $\lambda$ as discussed above and provided to the risk evaluator 215. The value of the noise scale 205 may be determined by a data consumer in relation to an acceptable accuracy level of results computed based on an analysis performed over anonymized data in comparison with results based on true original data. The consumption boundary value 210 is associated with anonymizing meter data 230 for consumed resources.

In some examples, the consumption boundary value 210 may be a maximum consumption $\Delta f$ defined as an overall maximum allowed consumption of the resource that is metered. For example, $\Delta f=48$ kW is the maximum power limit of 3-phased circuits in German residential homes. Thus, a data provider such as a household may determine the consumption boundary value as the maximum consumption on a metering scale, which may be called a global consumption value. However, the consumption boundary value 210 may be determined based on observed consumption values, and not only on the maximum limit on a scale for metering. Therefore, the consumption boundary value may be defined as a smaller, local consumption value $\Delta f$. For example, it may be defined as a local maximum value for observed values at historic meter data. Defining a local consumption boundary value that is lower than the maximum allowed consumption value is associated with identifying an actual privacy guarantee that correspond to historically predicted and expected metered values rather than on theoretical probability of metering a value of resource consumption. Considering the same noise scale value $\lambda$, since privacy guarantee is $\epsilon=\Delta f/\lambda$, a data provider may acquire a stronger protection against privacy inference under their local $\Delta f$, which corresponds to a stronger factual privacy guarantee (smaller $\epsilon$).

In the current example, the risk evaluator 215 receives the noise scale value 205 and the consumption boundary value 210 as input parameters that are used for computing an individual risk value 225. The individual risk value 225 is computed in relation to a data consumer associated with the noise scale value 205 and with the consumption boundary value 210 as defined by the data provider for the meter data 230. The meter data 230 may be anonymized according to the noise scale value 205 based on an evaluation of privacy identifiable probability defined by the individual risk value 225 at the risk evaluator 215.

In some implementations of the current disclosure, the individual risk value 225 may be computed according to equation (3) as presented above. The individual risk value 225 as computed depends on the privacy guarantee E. The privacy guarantee is defined as $\epsilon=\Delta f/\lambda$. Therefore, the individual risk value 225 is determined based on the defined consumption boundary value 210 and the noise scale value 205, and may be computed according to equation (4):

$$\rho = \frac{1}{1+e^{-\frac{\Delta f}{\lambda}}} > \frac{1}{2} \quad (4)$$

Equation (4) is a different form of representation of the individual risk value as a function of the noise scale value $\lambda$ and the defined consumption boundary value $\Delta f$.

In some implementations, the individual risk value 225 may be evaluated based on evaluation logic implemented at the risk evaluator 215. The calculated individual risk value 225 is a risk value within the range of 0.5 to 1. A higher individual risk value corresponds to a higher probability of privacy inference of the identity of the data provider if the provided data is anonymized based on the defined noise scale value 205 (e.g., the Laplace noise denoted by $\lambda$). An individual risk value of 0.5 is equal to random guessing for the data consumer to determine whether the data provider has contributed to an aggregated query on meter data or not. When a data provider wants to preserve the privacy of meter data, the individual risk value 225 is evaluated and compared with an acceptable risk value for inferring their data provider's identity. In such manner, the data provider interprets the effect of anonymizing the meter data according to the provided noise scale value 205. The computed individual risk value 225 is dependent on the consumption boundary value 210 that is used for the computation, as suggested at equation (4) above.

In the current example, the risk evaluator 215 evaluates the computed individual risk value 225. The evaluation may be performed based on evaluation logic defined by a data provider of the meter data 230. As a data provider wants the meter data to be privacy protected, a risk value closer to 0.5 can be determined to provide a high certainty of confidentiality. Therefore, the implemented evaluation logic may include comparing the computed individual risk value 225 with a threshold privacy level value. For example, the threshold privacy level may be defined at level equal to 0.6, 0.65, or else. The threshold privacy level may be dynamically provided as input to the risk evaluator 215 or may be set to a default static level.

A data provider (e.g., destination for metering consumed resources) may enjoys almost perfect privacy if an adversary is unable to confidently distinguish whether the data provider had contributed to an aggregate query (e.g., sum). Such a privacy level corresponds to a risk level $\rho \approx 0.5$, which corresponds to random guessing. If $\rho \approx 1$, then the privacy level is extremely low. Data consumers define an amount of noise, i.e. the noise scale value 205 $\lambda$, they accept with regard to performing data analyses, such as applying forecasting algorithms. The noise scale value 205 is interpreted by the data provider by computing the corresponding individual risk value 225 (i.e., the risk value $\rho$) to see how much data privacy the data consumer actually ensures. The data provider may interpret the noise scale value 205 with regard to distribution of values from the data metered at different time points in relation to consumption of resources.

The individual risk value 225 takes into account the noise scale value 205 as input provided by a data consumer and the consumption boundary value 210 that is relevant for the data providers. When the consumption boundary value 210 is defined at a lower point within a range on a scale of allowable consumption values, the individual risk value may define privacy protection that is adjusted to correspond to actual metered data observations at the data source. The individual risk value 225 may define a probability of privacy inference on a restricted range of data observations corresponding to historic meter data when the consumption boundary value 210 is defined at a lower level than the maximum allowable consumption limit. In such manner, the individual risk value 225 may be interpreted based on a worst-case scenario and represent a highest risk value as an upper risk limit when anonymizing under the noise scale value 205.

In some implementations of the current disclosure, the risk evaluator 215 may include evaluation logic implemented to determine whether the individual risk value 225 is acceptable. The evaluation logic may include determining that when the individual risk value 225 is higher than a threshold value, it is unacceptable to provide the meter data 230 to a data consumer at a data analysis system 240. Based on evaluations of the individual risk value 225, it may be determined to reject the proposed noise scale value 205 as an unacceptable for data anonymization of the meter data. When the individual risk value 225 is below the defined threshold value, it may be determined that the meter data 230 is acceptable to be provided to a data consumer in an anonymized form according to the noise scale value 205. A risk value below the threshold value may define that the data consumer (e.g., data analyst or other adversary) is not able to identify that a data provider has contributed with the meter data 230 for performing of a data query at the data analysis system 240. The data analysis system 240 may be a processing application or a data system of a data consumer, such as an energy provider. The data analysis system 240 may use anonymized meter data from data providers such as a set of households.

In some implementations of the current disclosure, the risk evaluator 215 may be implemented as part of a web portal including user interface (UI) to facilitate interactions with users, e.g. data consumers and data providers. For example, the UI on the web portal may be graphical user interface (GUI) including interaction elements where input parameters for computation and evaluation of risk values such as the individual risk value 225 are performed. For example, the GUI may be accessible by a data provider that may input the consumption boundary value 210 as an input for computing the individual risk value 225. The GUI may also support interactions with a data consumer to receive a noise scale value, such as the noise scale value 205. In other implementations, the consumption boundary value 210 and/or the noise scale value 205 may be set as default static values in the implemented logic of the risk evaluator 215.

In some implementations of the current disclosure, the risk evaluator 215 may include further logic to receive input for setting up a threshold privacy risk level for the data provider of the meter data. For example, the data provider may provide as input to the risk evaluator 215 both the consumption boundary value 210 and a threshold value on the scale of 0.5 to 1 for comparing with the individual risk value 225, as discussed above.

Based on evaluations of the individual risk value 225, it may be determined whether the meter data 230 may be provided in an anonymized form (according to the noise scale value 205) to a data consumer for analysis. The risk evaluator 215 and may provide as an output a notification to the data provider of the meter data 230 and to a data consumer inputting the noise scale value 205. For example, the risk evaluator 215 may request for a different noise scale value to perform the risk evaluation again, if the initially proposed noise scale value 205 is unacceptable. Additionally, and/or alternatively, the risk evaluator 215 may propose to a data provider to re-compute the individual risk value 225 with a different consumption boundary value.

In some implementations, the risk evaluator 215 may work independently of a data anonymizer 220, or it may be communicatively coupled to the data anonymizer 220. When the individual risk value 225 is determined to be higher than acceptable, e.g. above the threshold value, the meter data 230 may not be provided to the data anonymizer 220. When at the risk evaluator 215 it is determined that the individual risk value 225 is acceptable, the meter data 230 may be provided from a meter where meter data is generated to the data anonymizer 220 to be anonymized. For example, the anonymization of the meter data 230 at the data anonymizer 220 may be performed independently from the data consumer, e.g., at a data provider's side, or by an intermediary, to further protect the privacy of the meter data 230. The anonymization of the meter data 230 is performed according to the noise scale value 205, when the individual risk value 225 is accepted by the data provider.

In some implementations of the current disclosure, an information channel for the meter data 230 may be securely activated to provide anonymized data 235 from the data anonymizer 220 to the data analysis system 240. The data analysis system 240 may include analysis logic, such as forecasting algorithms, prediction and statistics methods, etc., which are executed over the anonymized data 235. When such analysis logic is applied over meter data including the anonymized data 235, the identity of the provider and the destination of the meter data 230 is privacy protected. The data analysis system 240 may include logic for running queries over the anonymized data 235. A query result based on such anonymized meter data provides a privacy guarantee corresponding to the computed individual risk value 225 for protecting the identity of the source destination of the meter data 230. The source destination of the meter data 230 has an acceptable low probability of being distinguished as a contributor to such a query result, as the meter data 230 is anonymized according to the noise scale value 205.

Figure 3:
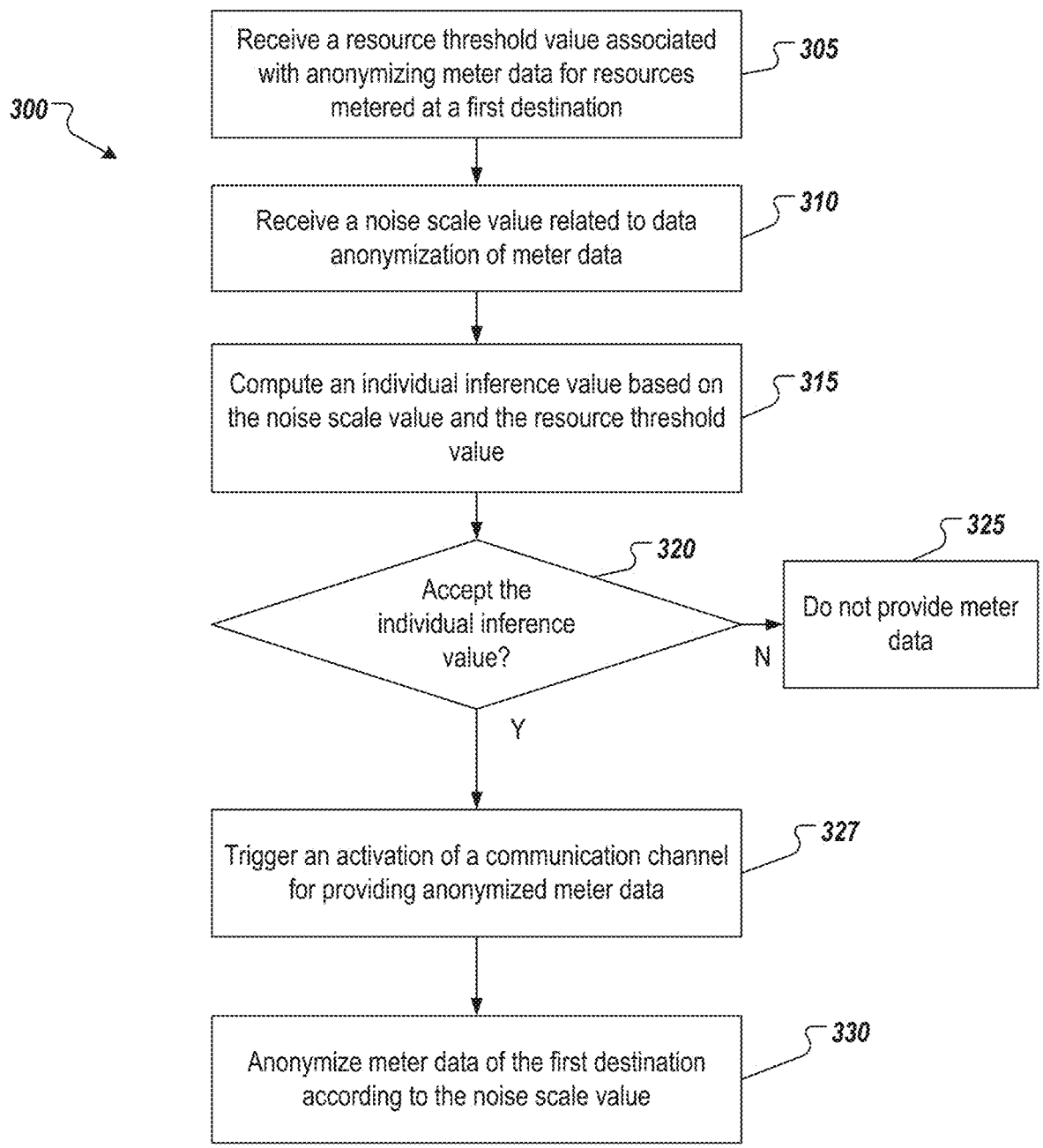
FIG. 3 depicts an example process that can be executed in accordance with implementations of the present disclosure.

FIG. 3 depicts an example process 300 that can be executed in accordance with implementations of the present disclosure.

At 305, a resource threshold value associated with anonymizing meter data for metered resources at a first destination is received. The resource threshold value may be such as the consumption boundary value 210 discussed in relation to FIG. 2. The resource threshold value is defined in relation to a data provider of meter data to a data consumer. In some examples, the resource threshold value may be defined based on evaluation of historic data associated with consumed resources at the first destination and a maximum value on a metering scale for the consumed resources.

At 310, a noise scale value is received. The noise scale value is related to data anonymization of meter data. The noise scale value may be such as the noise scale value 205 at FIG. 2. The noise scale value is defined for a processing application where meter data in anonymized form may be evaluated. For example, the processing application may be associated with a data consumer of the anonymized meter data. The noise scale value may be related to an effect of the anonymization technique applied over data on data analysis results. The noise scale value when used for anonymization of data may reflect to provide noise to the result that diverges from a result which could be obtained if no anonymization is applied. The noise scale value may be on a Laplace noise scale as discussed above. Anonymization of the meter data may reflect on accuracy level of query results based on anonymized data in relation to accuracy of results when acquired over true data.

At 315, based on the provided noise scale value and the resource threshold value, an individual inference value of the first destination as a source for the meter data is computed. The individual inference value defines a probability of distinguishing the first destination as a contributor to a query result computed based on anonymized meter data of the first destination and other destinations according to the noise scale value. For example, the computed individual inference value may be computed as described in relation to the individual risk value 225 computed at the risk evaluator 215 at FIG. 2.

At 320, it is determined whether the computed individual inference value is an acceptable value for providing meter data in anonymized form according to the received noise scale value at 310. For example, the individual inference value is compared in relation to an acceptable threshold risk value to determine whether to provide meter data in an anonymized manner according to the received noise scale value. The evaluation of whether the individual inference value is acceptable or not may be performed as described in relation to FIG. 2 and the evaluations performed at the risk evaluator 215. In some examples, the evaluation of the individual inference value may be performed outside of a risk evaluator and based on user interactions with a data provider that provide input for acceptance or rejection of the individual inference value. The computed individual inference value may be provided to a data provider at a user interface of an application where the individual inference value was computed. The data provider may interact with the application to determine how to proceed based on the output risk value.

At 325, based on determining that the individual inference value is not acceptable, it is determined that meter data for consumed resources at the first destination is not to be provided to an external party, such as the data consumer associated with the provided noise scale value.

At 327, an activation of a communication channel for providing the anonymized meter data for metered resources at the first destination to the processing application is triggered. The communication channel may be defined between the first destination and the processing application directly, or it may be defined through an intermediary, such as a risk evaluation module. For example, a risk evaluation module such as the risk evaluator 215 may be an intermediary in the communication of anonymized meter data between the first destination and the processing application.

At 330, based on determining that the individual inference value is acceptable, the meter data of the first destination is anonymized according to the noise scale value.

Figure 4:
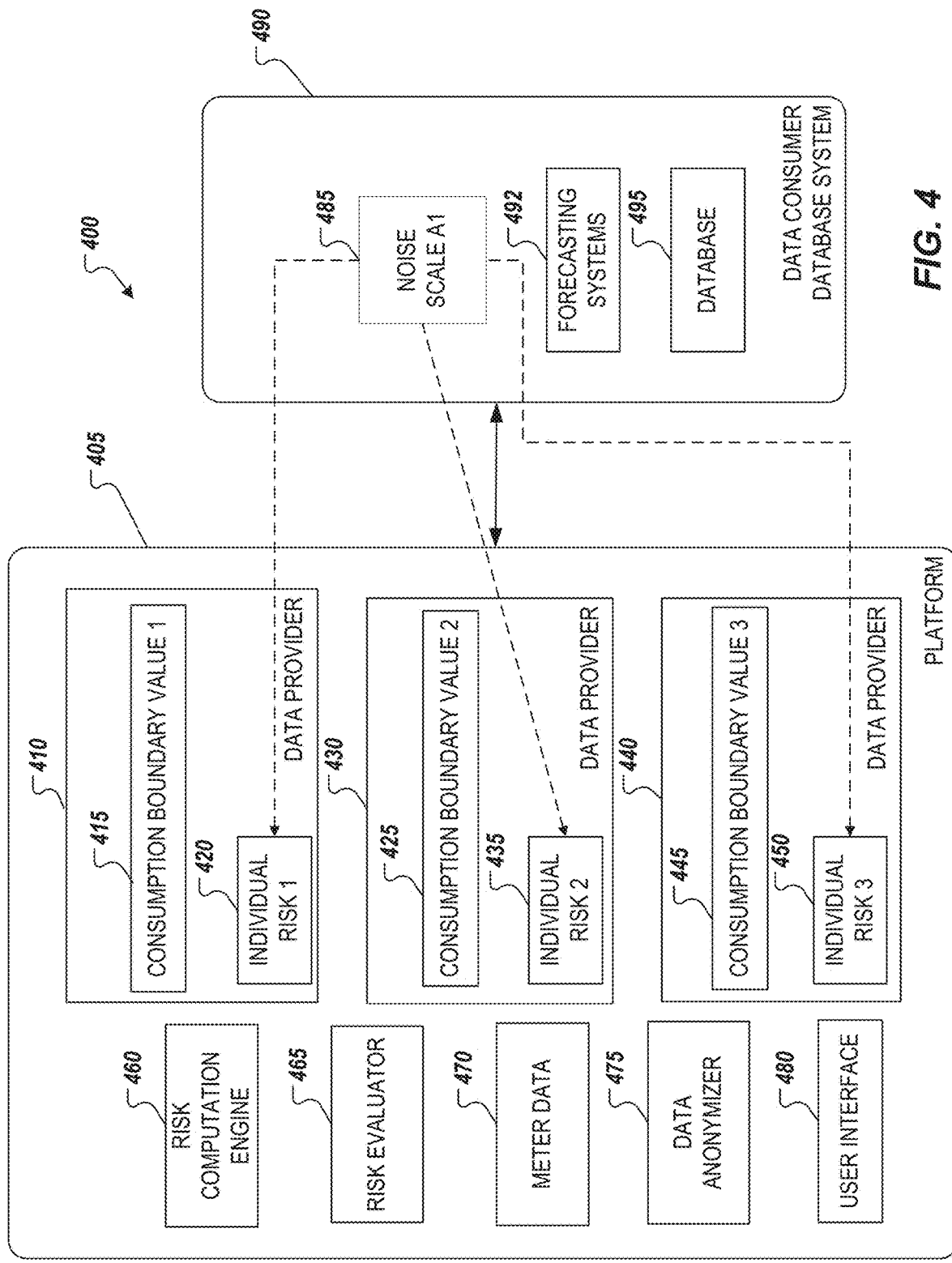
FIG. 4 depicts an example computer architecture implemented to evaluate individual probability of distinguishing of data providers based on provided meter data to a data consumer in accordance with implementations of the present disclosure.

FIG. 4 depicts an example computer architecture 400 implemented to evaluate individual probability of distinguishing of data providers based on provided meter data to a data consumer in accordance with implementations of the present disclosure.

The current example architecture 400 includes a platform 405 and a data consumer database system 490. The platform 405 is a computing platform that is set up to provide software and hardware resources that may be utilized for computing and evaluating risk. The platform 405 may be implemented to compute privacy inference risks of meter data when anonymized according to a given noise scale value and later analyzed at the data consumer database system 490. The platform 405 includes implemented logic that is configured to receive data and input from external sources and perform data evaluation and computations. The platform 405 may be configured to execute at least some of the process steps defined at the example process 300 at FIG. 3. The platform 405 as defined in FIG. 4 is related to a number of data providers of meter data, however, the platform 405 may be configured to provide risk evaluation services to a different set of data providers and may correspond to the conceptual architecture of FIG. 2.

The platform 405 includes a risk computation engine 460, a risk evaluator 465, meter data 470, data anonymizer 475, a user interface 480, and data providers 410, 430 and 440 that are communicatively coupled in relation to risk evaluations and computations. The meter data 470 may be such as the meter data discussed in relation to FIGS. 1, 2, and 3 above.

The platform 405 is coupled to the data consumer database system 490 to receive "Noise scale A1" 485 as an input to evaluate whether the meter data 470 associated with the data providers, may be acceptable provided under acceptable privacy guarantees. The platform 405 may evaluate whether anonymization of the meter data 470 may protect the privacy inference of the identity of the data providers as contributors to results from data analysis over the anonymized data. The data analysis may be such as forecasting algorithm performed at a forecasting system 492 at the data consumer database system 490. The database 495 stores data that is used by the data consumer in relation to performing data analysis and may include anonymized data related to privacy protected data and further other data that is not privacy protected as not privacy sensitive.

In some examples, the "Noise scale A1" 485 may be defined in relation to a particular data analysis, or to more than one data analysis. Alternatively, a different noise scale value may be defined for different data analysis performed at the data consumer database system 490 over data stored at the database 495.

The data providers may include data provider 410, data provider 430, and data provider 440. At the platform 405, it may be determined whether the meter data 470 is acceptable to be provided to the data consumer and used for performing data analysis, for example at the forecasting system 492, and/or stored in anonymized form at the database 495 to be used for further data analysis.

In the current example, individual risk values for the data providers are computed based on the provided "Noise scale A1" 485 value by the data consumer. The "Noise scale A1" 485 value may be such as the noise scale value described in relation to FIG. 1, FIG. 2, and FIG. 3. The "Noise scale A1" 485 is associated with noise being added to data when anonymizing, e.g., according to the Laplace mechanism as described above.

For a data provider associated with providing meter data for consumed resources at a corresponding destination, a consumption boundary value is determined. The consumption boundary value is defined for a data provider and may be set on a meter scale for measuring the consumption of the resources at the corresponding destination. The consumption boundary value may be determined as discussed in relation to FIG. 2 and FIG. 3. For the data provider 410, a "Consumption boundary value 1" 415 is defined, and the "Individual risk 1" 420 is computed based on the "Noise scale A1" 485 and the "Consumption boundary value 1" 415. For the data provider 430, a "Consumption boundary value 2" 425 is defined, and the "Individual risk 2" 435 is computed based on the "Noise scale A1" 485 and the "Consumption boundary value 2" 425. For the data provider 440, a "Consumption boundary value 3" 445 is defined, and the "Individual risk 3" 450 is computed based on the "Noise scale A1" 485 and the "Consumption boundary value 3" 445.

In some implementations of the current disclosure, the consumption boundary value and the threshold value for evaluation of computed individual risk values may be received as input from the data providers. The input may be received via an interaction of a user associated with a given data provider, e.g. data provider 410, and a provided user interface 480 of the platform 405. The user interface 480 may be exposed to external access from users associated with data providers evaluating their risk of privacy inferences of providing meter data to the data consumer associated with the data consumer database system 490.

The risk computation engine 460 may be such that includes implemented logic to compute an individual risk value, such as the individual risk value 225 at FIG. 2. The individual risk value may be computed based on the equation (4) as presented above. The individual risk value is computed based on two inputs—the noise scale as provided ("Noise scale A1" 485) and a consumption boundary value associated with the data provider. The risk computation engine 460 computes individual risk value for the data providers, such as the "Individual Risk 1" 420, the "Individual Risk 2" 435, and the "Individual Risk 3" 445. For example, the "Individual Risk 1" 420 is computed based on the "Noise scale A1" 485 and the "Consumption boundary value 1" 415. The individual risk values determined per data provider may be different as they may be based on different input values.

At the risk evaluator 465, it is determined whether the individual risk values, e.g. the "Individual risk 1" 420, is acceptable or not for a data provider. When the risk values are evaluated at the risk evaluator 465, the computed individual risk values may be compared with a threshold value defined per data provider, or a globally defined threshold value relevant for the data providers associated with the platform 405.

In some implementations, the risk evaluator 465 is in communication with a data anonymizer 475. Based on the evaluation of the individual risk values, it may be determined whether meter data part of the meter data 470 associated with a given data provider may be anonymized by the data anonymizer 475 and provided to the data consumer database system 490. The meter data that is anonymized by the data anonymizer 475 may be provided in a secure manner to the data consumer database system 490. The data consumer database system 490 may store the received anonymized meter data at the database 495 and use it as input for the forecasting system 492.

Alternatively, and not shown on FIG. 4, the data anonymizer 475 may be implemented outside of the platform 405 and be in communication with the platform 405. The data anonymizer 475 may be configured at a meter where data for consumed resources is collected, for example, at a household meter for collecting meter data for energy consumption. The data anonymizer 475 may receive a notification from the risk evaluator 465 whether it is acceptable to provide stored meter data. If acceptable, the data anonymizer 475 anonymizes the stored meter data according to the "Noise scale A1" 485 and communicates it over an activated secure channel with the data consumer database system 490 directly, or via the platform 405.

In some implementations of the current disclosures, the data anonymizer 475 anonymizes meter data from the meter data 470 according to a differential privacy algorithm, such as the Laplace mechanism as discussed above. The "Noise scale A1" 485 may be used in the anonymization as a noise value λ in the anonymization techniques. A risk evaluator determines that meter data of a given data provider is acceptable to be provided to the data consumer and the data consumer database system 490. A secure communication channel between the platform 405 and the data consumer database system 490 may be established. After activation, data providers may release data perturbed with gamma distributed noise at a measuring point $t_i$ through the secure channel (e.g., encrypted) with the data consumer associated with the defined "Noise scale A1" 485 value according to the Laplace mechanisum.

The process of anonymizing through applying differential privacy in such manner may have several benefits. The data consumer (e.g. tha data consumer database system 490) does not have to perform any perturbation on meter data as noise is added either locally by a meter at a destination for metering consumption data or at the platform 405. The anonymization is performed through perturbation of the meter data following the Laplace mechanism. In addition, data consumers can select the amount of noise A they tolerate with regard to their algorithms implemented by their data analysis engines. The data consumers may configure the amount of noise which is associated with an acceptable accuracy level as a parameter at the data consumer database system 490 and may communicate it to a data provider via the platform 405. When the defined noise scale value is propagated to data providers, the computed individual risk value per data provider may be interpreted for a provider of the data providers, and it may be determined how much data privacy the data consumer actually ensures for the data providers with the provided noise scale value.

Figure 5:
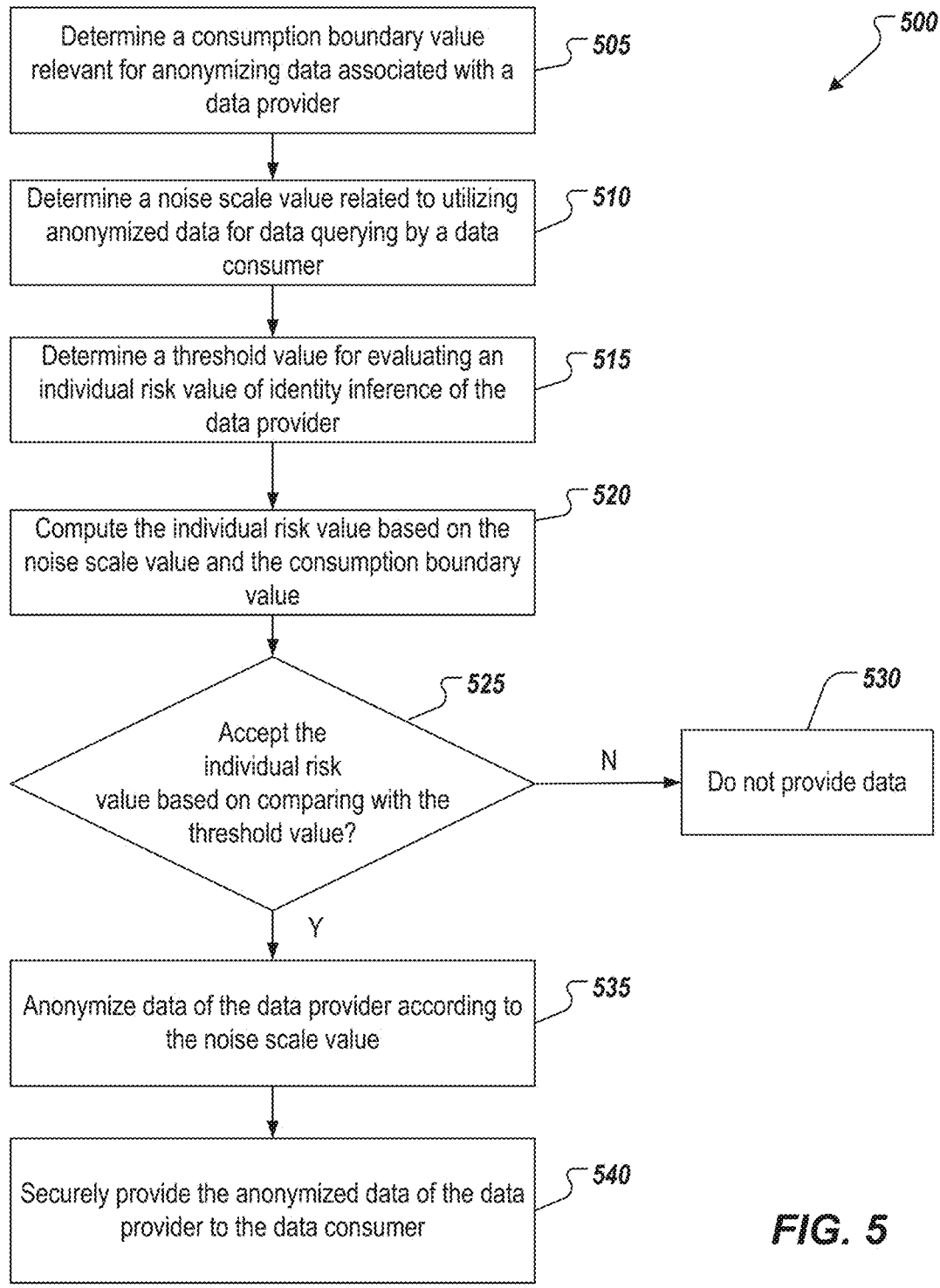
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

At 505, a consumption boundary value is determined. The consumption boundary value is relevant for anonymizing data associated with a data provider. The data that is to be anonymized is meter data for consumed resources at a destination for collecting data for the data provider. For example, the meter data may be energy consumption data at a household location of a data provider. The energy consumption data is privacy sensitive data which may be provided to an adversary in an anonymized form to protect the privacy inference of the identity of the data provider and the destination of the data collection. The determined consumption boundary value may be such as the consumption boundary value 210 and be defined as described in relation to the description of FIG. 2.

At 510, a noise scale value for anonymizing meter data is determined. The noise scale value may be such as the noise scale value 205 at FIG. 2. The noise scale value is related to utilizing anonymized data for data querying by a data consumer. As discussed above, anonymization of data may affect data analysis accuracy, as data is provided with random noise during anonymization. Therefore, by applying anonymization techniques with a different noise scale level, a different level of privacy protection for inference of the identity of the data source may be provided. For example, a higher privacy protection level may be associated with a less accurate analysis result based on querying the anonymized data compared to results from querying the data in its original unprotected form.

At 515, a threshold value is determined for evaluating an individual risk value of identity inference of the data that is to be anonymized. The threshold value may be determined as discussed above in relation to evaluation of the individual risk value in relation to FIG. 1, FIG. 2, FIG. 3, and FIG. 4. The threshold value may be a value in the range of the risk value, i.e. 0.5 to 1. The threshold value corresponds to the percentage probability of inferring an identity of a contributor of meter data to a query result. For example, the threshold value may be determined to be 0.6 which may be defined as an acceptable protection level for inferring the identity of a data provider.

At 520, the individual risk value is computed. The individual risk value may be such as the individual risk value 225 at FIG. 2, or such as the individual risk values discussed in relation to FIG. 4. The individual risk value may be computed according to the description of the computations performed at the risk evaluator 215, or as described in relation to block 315 of FIG. 3. The individual risk value is computed based on the noise scale value and the consumption boundary value as determined. The computation of the individual risk value may be performed at a separate computer system or engine that is independent of systems used by data consumers and/or data providers. The individual risk value may be computed as defined at equation (4). The individual risk defines a probability value for inferring the identity of a data provider when data is anonymized according to the noise scale value and also when the risk is evaluated according to a certain range of values defined by the consumption boundary value.

At 525, the individual risk value is evaluated based on the threshold value as defined. The evaluation may be such as a determination of whether the individual risk value is acceptable or not based on comparison with the threshold value. When the individual risk value is lower than the threshold value, it may be determined that the individual risk value is acceptable, and that data may be provided for anonymization and released to a data consumer. When the individual risk value is higher than the threshold value, it may be determined that the individual risk value is not acceptable and that no data is to be provided at 530.

Based on determining that the individual risk is acceptable, at 535, the data is anonymized according to the provided noise scale value. The data anonymization may be performed according to the Laplace mechanism as discussed above. The anonymization of the data is performed according to the tolerated noise by the data consumer, where the tolerated noise is identified as the noise scale value determined at 510. The anonymization of the data may be performed at the data provider side so that the data consumer has no access or inference over the anonymization and original data access is restricted.

At 535, the anonymized data is provided to the data consumer. For example, the data as anonymized may be stored at a database system of the data provider, or it may be anonymized at a data anonymization service system, independent of the data provider or data consumer. The anonymized data is provided in a secure manner, e.g. in encrypted form, to the data consumer. Such anonymized data may be stored at a system of the data consumer and used for data analysis. The identity of a data provider being inferred when data analysis is performed over such data is privacy protected with a level of protection corresponding to the individual risk value, as computed at 520.

Figure 6:
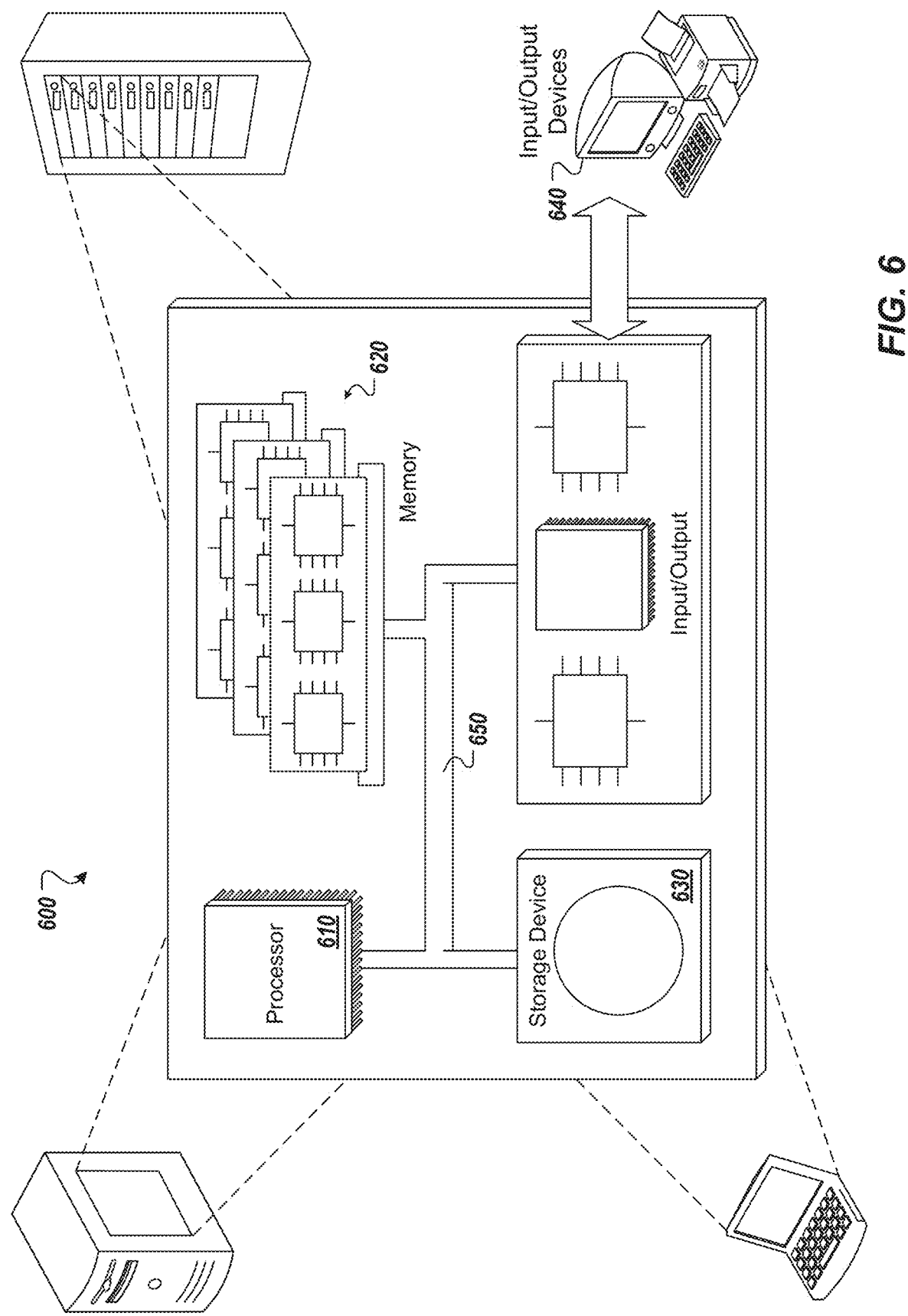
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, the method being executed by one or more processors and comprising:
   receiving a resource threshold value associated with anonymizing meter data for resources metered at a first destination;
   based on a noise scale value and the resource threshold value, computing an individual inference value of the first destination, the individual inference value defining a probability of distinguishing the first destination as a contributor to a query result based on anonymized meter data of the first destination and other destinations according to the noise scale value, wherein the noise scale value is defined for a processing application;
   based on evaluating the individual inference value, determining to provide anonymized meter data for metered resources at the first destination; and
   triggering an activation of a communication channel for providing the anonymized meter data for metered resources at the first destination to the processing application.

2. The method of claim 1, further comprising:
anonymizing meter data for resources consumed at the first destination based on the noise scale value.

3. The method of claim 1, further comprising:
activating the communication channel for providing the anonymized meter data for consumed resources at the first destination to the processing application directly.

4. The method of claim 1, wherein the query result is associated with an acceptable accuracy level for a data consumer associated with the processing application, and wherein the acceptable accuracy level relates to a deviation of an algorithm applied on the meter data anonymized according to the noise scale value to compute the query result.

5. The method of claim 1, wherein the resource threshold value is defined based on evaluation of historic data associated with consumed resource at the first destination and a maximum value on a metering scale for the resources metered at the first destination.

6. The method of claim 5, further comprising:
receiving the resource threshold value as a user input at a web portal, wherein the resource threshold value is a lower value than a maximum value on the metering scale for the resources metered at the first destination; and
presenting the computed individual inference value on the web portal.

7. The method of claim 1, wherein determining to provide the anonymized meter data further comprises:
determining whether the individual inference value is acceptable based on a comparison with a threshold value defining an acceptable confidentiality inference probability of the first destination.

8. The method of claim 7, wherein determining whether the individual inference value is acceptable further comprises:
receiving an input identifying the threshold value for the individual inference value; and
when the computed individual inference value is below the threshold value, determining that the individual inference value is acceptable.

9. A non-transitory computer-readable storage medium coupled to one or more processors and having instructions stored thereon which, when executed by the one or more processors, cause the one or more processors to perform operations the operations comprising:
receiving a resource threshold value associated with anonymizing meter data for resources metered at a first destination;
based on a noise scale value and the resource threshold value, computing an individual inference value of the first destination, the individual inference value defining a probability of distinguishing the first destination as a contributor to a query result based on anonymized meter data of the first destination and other destinations according to the noise scale value, wherein the noise scale value is defined for a processing application;
based on evaluating the individual inference value, determining to provide anonymized meter data for metered resources at the first destination; and
triggering an activation of a communication channel for providing the anonymized meter data for metered resources at the first destination to the processing application.

10. The computer-readable storage medium of claim 9, further comprising instructions which when executed cause the one or more processors to perform operations comprising:
anonymizing meter data for resources consumed at the first destination based on the noise scale value; and
activating the communication channel for providing the anonymized meter data for consumed resources at the first destination to the processing application directly.

11. The computer-readable storage medium of claim 9, wherein the query result is associated with an acceptable accuracy level for a data consumer associated with the processing application, and wherein the acceptable accuracy level relates to a deviation of an algorithm applied on the meter data anonymized according to the noise scale value to compute the query result.

12. The computer-readable storage medium of claim 9, wherein the resource threshold value is defined based on evaluation of historic data associated with consumed resource at the first destination and a maximum value on a metering scale for the resources metered at the first destination.

13. The computer-readable storage medium of claim 12, further comprising instructions which when executed cause the one or more processors to perform operations comprising:
receiving the resource threshold value as a user input at a web portal, wherein the resource threshold value is a lower value than a maximum value on the metering scale for the resources metered at the first destination; and
presenting the computed individual inference value on the web portal.

14. The computer-readable storage medium of claim 13, wherein the operations for determining to provide the anonymized meter data further comprise:
determining whether the individual inference value is acceptable based on a comparison with a threshold value defining an acceptable confidentiality inference probability of the first destination, wherein determining whether the individual inference value is acceptable comprises:
receiving an input identifying the threshold value for the individual inference value; and
when the computed individual inference value is below the threshold value, determining that the individual inference value is acceptable.

15. A system, comprising:
a computing device; and
a computer-readable storage device coupled to the computing device and having instructions stored thereon which, when executed by the computing device, cause the computing device to perform operations, the operations comprising:
receiving a resource threshold value associated with anonymizing meter data for resources metered at a first destination;
based on a noise scale value and the resource threshold value, computing an individual inference value of the first destination, the individual inference value defining a probability of distinguishing the first destination as a contributor to a query result based on anonymized meter data of the first destination and other destinations according to the noise scale value, wherein the noise scale value is defined for a processing application;
based on evaluating the individual inference value, determining to provide anonymized meter data for metered resources at the first destination; and triggering an activation of a communication channel for providing the anonymized meter data for metered resources at the first destination to the processing application.

16. The system of claim 15, wherein the computer-readable storage device includes further instructions which when executed by the computing device, cause the computing device to perform operations comprising: anonymizing meter data for resources consumed at the first destination based on the noise scale value; and
  activating the communication channel for providing the anonymized meter data for consumed resources at the first destination to the processing application directly.

17. The system of claim 15, wherein the query result is associated with an acceptable accuracy level for a data consumer associated with the processing application, and wherein the acceptable accuracy level relates to a deviation of an algorithm applied on the meter data anonymized according to the noise scale value to compute the query result.

18. The system of claim 15, wherein the resource threshold value is defined based on evaluation of historic data associated with consumed resource at the first destination and a maximum value on a metering scale for the resources metered at the first destination.

19. The system of claim 18, the computer-readable storage device includes further instructions which when executed by the computing device, cause the computing device to perform operations comprising:
  receiving the resource threshold value as a user input at a web portal, wherein the resource threshold value is a lower value than a maximum value on the metering scale for the resources metered at the first destination; and
  presenting the computed individual inference value on the web portal.

20. The system of claim 19, wherein the operations for determining to provide the anonymized meter data further comprise:
  determining whether the individual inference value is acceptable based on a comparison with a threshold value defining an acceptable confidentiality inference probability of the first destination, wherein determining whether the individual inference value is acceptable comprises:
    receiving an input identifying the threshold value for the individual inference value; and
    when the computed individual inference value is below the threshold value, determining that the individual inference value is acceptable.

* * * * *